US009823558B2

(12) United States Patent
Akiyama (10) Patent No.: US 9,823,558 B2
(45) Date of Patent: Nov. 21, 2017

(54) LIGHT SOURCE DEVICE, METHOD FOR MANUFACTURING LIGHT SOURCE DEVICE, AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 132 days.

(21) Appl. No.: 14/744,711

(22) Filed: Jun. 19, 2015

(65) Prior Publication Data

US 2015/0378249 A1    Dec. 31, 2015

(30) Foreign Application Priority Data

Jun. 26, 2014  (JP) ................... 2014-131270

(51) Int. Cl.
  *G03B 21/20*    (2006.01)
  *G02B 5/04*     (2006.01)

(52) U.S. Cl.
  CPC ........... *G03B 21/2046* (2013.01); *G02B 5/04* (2013.01); *G03B 21/208* (2013.01); *G03B 21/2013* (2013.01)

(58) Field of Classification Search
  CPC ............ G03B 21/2013; G03B 21/2046; G03B 21/208
  See application file for complete search history.

(56) References Cited

U.S. PATENT DOCUMENTS

| 6,563,567 B1* | 5/2003 | Komatsuda ......... G03F 7/70075 355/53 |
| 2013/0215397 A1* | 8/2013 | Matsubara ........... G03B 21/204 353/57 |

FOREIGN PATENT DOCUMENTS

| CN | 103201678 A | 7/2013 |
| JP | H05-2147 A | 1/1993 |
| JP | H06-34910 A | 2/1994 |
| JP | 2005-250123 A | 9/2005 |
| JP | 2010-078975 A | 4/2010 |

* cited by examiner

*Primary Examiner* — Sultan Chowdhury
*Assistant Examiner* — Magda Cruz
(74) *Attorney, Agent, or Firm* — Oliff PLC (57) ABSTRACT

A light source device includes: a first semiconductor laser; a second semiconductor laser; a first collimator lens corresponding to the first semiconductor laser; a second collimator lens corresponding to the second semiconductor laser; and a deflection prism provided on the light exiting side of the first collimator lens so that an angle formed by a principal ray of first light emitted from the first semiconductor laser and a principal ray of second light emitted from the second semiconductor laser is smaller on the light exiting side of the deflection prism than on the light incident side thereof.

12 Claims, 7 Drawing Sheets

LIGHT SOURCE DEVICE, METHOD FOR MANUFACTURING LIGHT SOURCE DEVICE, AND PROJECTOR

BACKGROUND

1. Technical Field

The present invention relates to a light source device, a method for manufacturing a light source device, and a projector.

2. Related Art

A solid-state light source, such as a semiconductor laser, with which high-luminance and high-output light is obtainable has attracted attention as a light source used for a projector. A projector using the solid-state light source has advantages such as enabling the downsizing of a device, having excellent color reproducibility, enabling instant lighting, and having a long life of the light source. JP-A-2010-78975 discloses an illumination device including a plurality of laser light sources, a plurality of collimate lenses, a condensing lens, and a rod integrator. In the illumination device disclosed in JP-A-2010-78975, a plurality of lights emitted from the plurality of laser light sources pass through the collimate lenses corresponding to the respective laser light sources, are incident on the condensing lens, concentrated by the condensing lens, and incident on the rod integrator.

In an illumination device including a plurality of laser light sources, somewhat variation inevitably occurs in the mounting accuracy of the laser light sources. In the illumination device disclosed in JP-A-2010-78975, when the mounting accuracy of the laser light sources is varied, light emitted from a laser light source that is mounted at a position deviated from a predetermined design position may not foe incident on the rod integrator. In that case, there is a problem that the light-use efficiency of the illumination device is reduced.

SUMMARY

An advantage of some aspects of the invention is to provide a light source device in which a reduction in light-use efficiency can be suppressed even when there are variations in the mounting accuracy of solid-state light sources. Another advantage of some aspects of the invention is to provide a method for efficiently manufacturing a light source device in which a reduction in light-use efficiency can be suppressed. Still another advantage of some aspects of the invention is to provide a projector including the light source device.

A light source device according to an aspect of the invention includes: a first solid-state light source; a second solid-state light source; a first collimator lens corresponding to the first solid-state light source; a second collimator lens corresponding to the second solid-state light source; a deflection prism provided on the light exiting side of the first collimator lens so that an angle formed by a principal ray of first light emitted from the first solid-state light source and a principal ray of second light emitted from the second solid-state light source is smaller on the light exiting side of the deflection prism than on the light incident side thereof; and a holding portion that holds the deflection prism.

It is assumed in the light source device including the first solid-state light source and the second solid-stats light source that the mounting position of the first solid-state light source is deviated from the focal position of the first collimator lens, and that the mounting position of the second solid-state light source coincides with the focal position of the second collimator lens. In that case, the principal ray of the first light emitted from the first solid-state light source and the principal ray of the second light emitted from the second solid-state light source are not parallel to each other after the principal rays transmitted through the first collimator lens and the second collimator lens, respectively.

In contrast, in the light source device according to the aspect of the invention, the angle formed by the principal ray of the first light and the principal ray of the second light is smaller on the light exiting side of the deflection prism than on the light incident side thereof with the help of the deflection prism provided on the light editing side of the first collimator lens. That is, it is possible with the help of the deflection prism to increase the parallelism between the principal ray of the first light and the principal ray of the second light. In this manner, the irradiation position of light from the first solid-state light source that is mounted at the position deviated from the predetermined position can be corrected by the deflection prism. According to the light source device according to the aspect of the invention, even when there are variations in the mounting accuracy of the solid-state light sources, light-use efficiency can be increased.

In the light source device according to the aspect of the invention, when the principal ray of the first light and the principal ray of the second light are parallel to each other on the light exiting side of the deflection prism, the angle formed by the principal ray of the first light and the principal ray of the second light is deemed as 0°. This case is also included in the concept that "the angle formed by the principal ray of the first light and the principal ray of the second light is smaller on the light exiting side of the deflection prism than on the light incident side thereof".

In the light source device according to the aspect of the invention, the deflection prism may be held by the holding portion so as to be rotatable about a predetermined axis of rotation.

According to this configuration, the angle formed by the principal ray of light emitted from the first solid-state light source and the principal ray of light emitted from the second solid-state light source can be easily adjusted to be small by rotating the deflection prism about the predetermined axis of rotation.

In the invention, the phrase "the holding portion that holds the deflection prism so as to be rotatable about the predetermined axis of rotation" means that the holding portion does not include a portion that restricts the rotation of the deflection prism about the predetermined axis of rotation. It is sufficient that the deflection prism is configured to be able to rotate in a manufacturing process of the light source device. The "holding portion" may not necessarily hold the deflection prism in a state where the deflection prism can freely rotate about the predetermined axis of rotation after the light source device is completed. For example, after the light source device is completed, the deflection prism may be in a state where the deflection prism is fixed to the holding portion and cannot rotate.

In the light source device according to the aspect of the invention, the shape of the deflection prism as viewed from a direction of the axis of rotation may be a circle.

According to this configuration, it is possible to smoothly rotate the deflection prism about the optical axis of the first collimator lens.

In the light scarce device according to the aspect of the invention, a light incident surface of the deflection prism may be flat.

According to the light source device having the above configuration, if is possible to correct the position deviation of the solid-state light source in a direction vertical to the optical axis of the first collimator lens.

In the light source device according to the aspect of the invention, a light incident surface of the deflection prism may be a rotationally symmetric and convex.

According to the light source device having the above configuration, since the deflection prism exerts an action of collimating divergent light, it is possible to correct the position deviation of the solid-state light source in a direction parallel to the optical axis of the first collimator lens, especially the position deviation to the side closer to the first collimator lens than the focal position of the first collimator lens.

In the light source device according to the aspect of the invention, a light incident surface of the deflection prism may be a rotationally symmetric and concave.

According to the light source device having the above configuration, since the deflection prism exerts an action of collimating convergent light, it is possible to correct the position deviation of the solid-state light source in the direction parallel to the optical axis of the first collimator lens, especially the position deviation to the side farther from the first collimator lens than the focal position of the first collimator lens.

A method for manufacturing a light source device according to another aspect of the invention is a method for manufacturing a light source device including a first solid-state light source, a second solid-state light source, a first collimator lens corresponding to the first solid-state light source, a second collimator lens corresponding to the second solid-state light source, a deflection prism, and a holding portion that holds the deflection prism. The method includes: inspecting whether or not a projected image of light emitted from the first solid-state light source is located outside an allowable range on a projected surface away from the first collimator lens; disposing, when the projected image of light emitted from the first solid-state light source is located outside the allowable range, the deflection prism on the light exiting side of the first collimator lens; and rotating the deflection prism about an optical axis of the first collimator lens, whereby the projected image located outside the allowable range moves to an inside of the allowable range and an angle formed by a principal ray of first light emitted from the first solid-state light source and a principal ray of second light emitted from the second solid-state light source becomes smaller on the light exiting side of the deflection prism than on the light incident side thereof.

It is assumed in the light source device including the first solid-state light source and the second solid-state light source that the mounting position of the first solid-state light source is deviated from the focal position of the first collimator lens, and that the mounting position of the second solid-state light source coincides with the focal position of the second collimator lens. In that case, the principal ray of light from the first solid-state light source, which is emitted from the first collimator lens, and the principal ray of light from the second solid-state light source, which is emitted from the second collimator lens, are not parallel to each other.

In contrast, according to the method for manufacturing the light source device according to the aspect of the invention, when a manufacturer finds out that the projected image of light emitted from the first solid-state light source is located outside the allowable range, the manufacturer disposes the deflection prism on the light exiting side of the first collimator lens, and rotates the deflection prism about the optical axis or the first collimator lens to move the projected image to the inside of the allowable range. As described above, since it is sufficient that an adjustment is performed with the deflection prism on the solid-state light source whose mounting position is deviated, the light source device in which a reduction in light-use efficiency is suppressed can be manufactured with good productivity.

In the method for manufacturing the light source device according to the aspect of the invention, after the projected image located outside the allowable range is moved to the inside of the allowable range by rotating the deflection prism about a predetermined axis in a state of being held by the holding portion, the deflection prism may be fixed to the holding portion.

According to the above configuration, the light source device can stably maintain the effect of suppressing a reduction in light-use efficiency.

A projector according to still another aspect of the invention includes: a light source device that emits light; a light modulator that modulates the light in accordance with image information to thereby form image light; and a projection optical system that projects the image light, wherein the light source device is the light source device according to the aspect of the invention.

Since the projector according to the aspect of the invention includes the light source device according to the aspect of the invention, it is possible to realize a projector having excellent light-use efficiency.

BRIEF DESCRIPTION OF THE DRAWINGS

The invention will be described with reference to the accompanying drawings, wherein the numbers reference like elements.

DESCRIPTION OF EXEMPLARY EMBODIMENTS

First Embodiment

Hereinafter, a first embodiment of the invention will be described with reference to FIGS. 1 to 8.

A projector of the embodiment is an example of a projector using three transmissive liquid crystal light valves.

Figure 1:
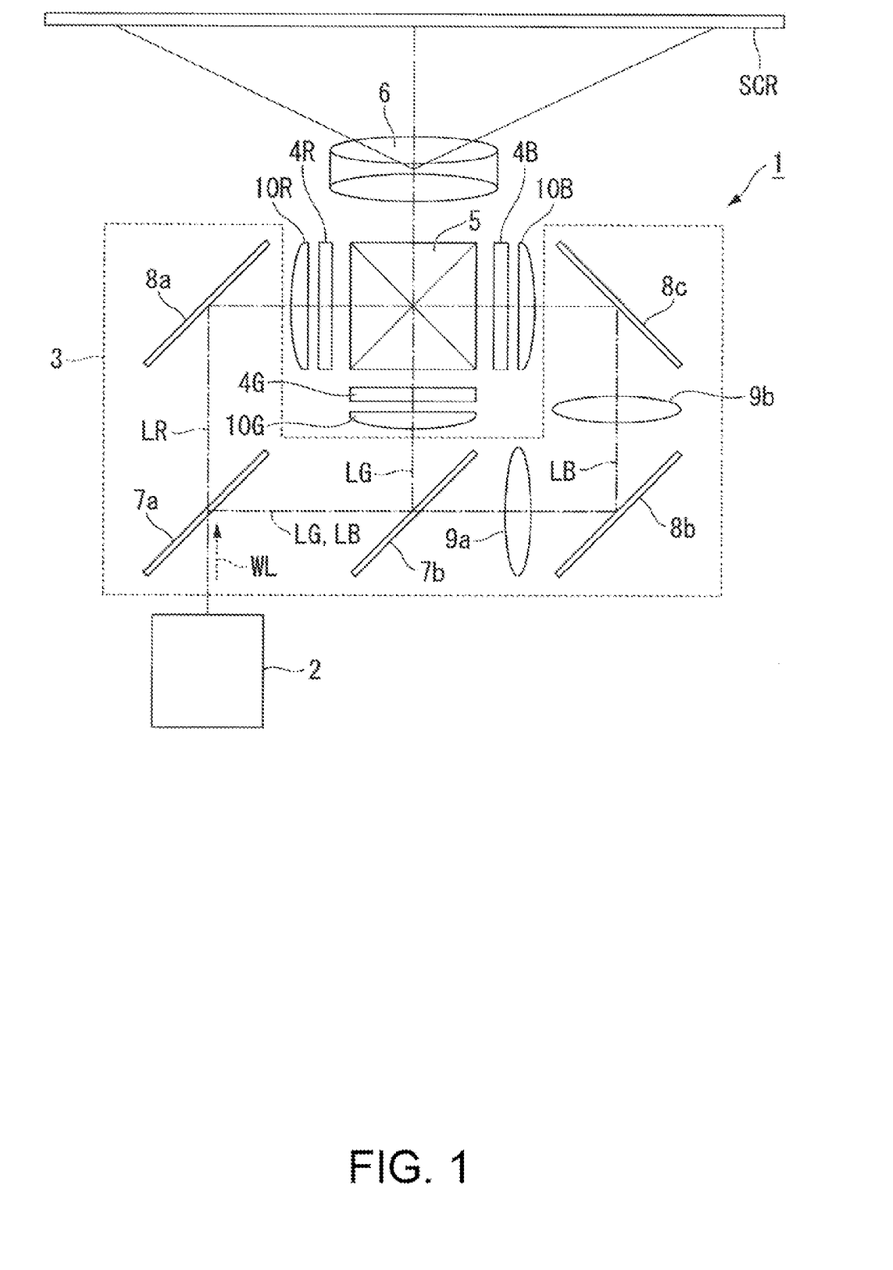
FIG. 1 is a schematic configuration diagram showing a projector of a first embodiment.
Figure 2:
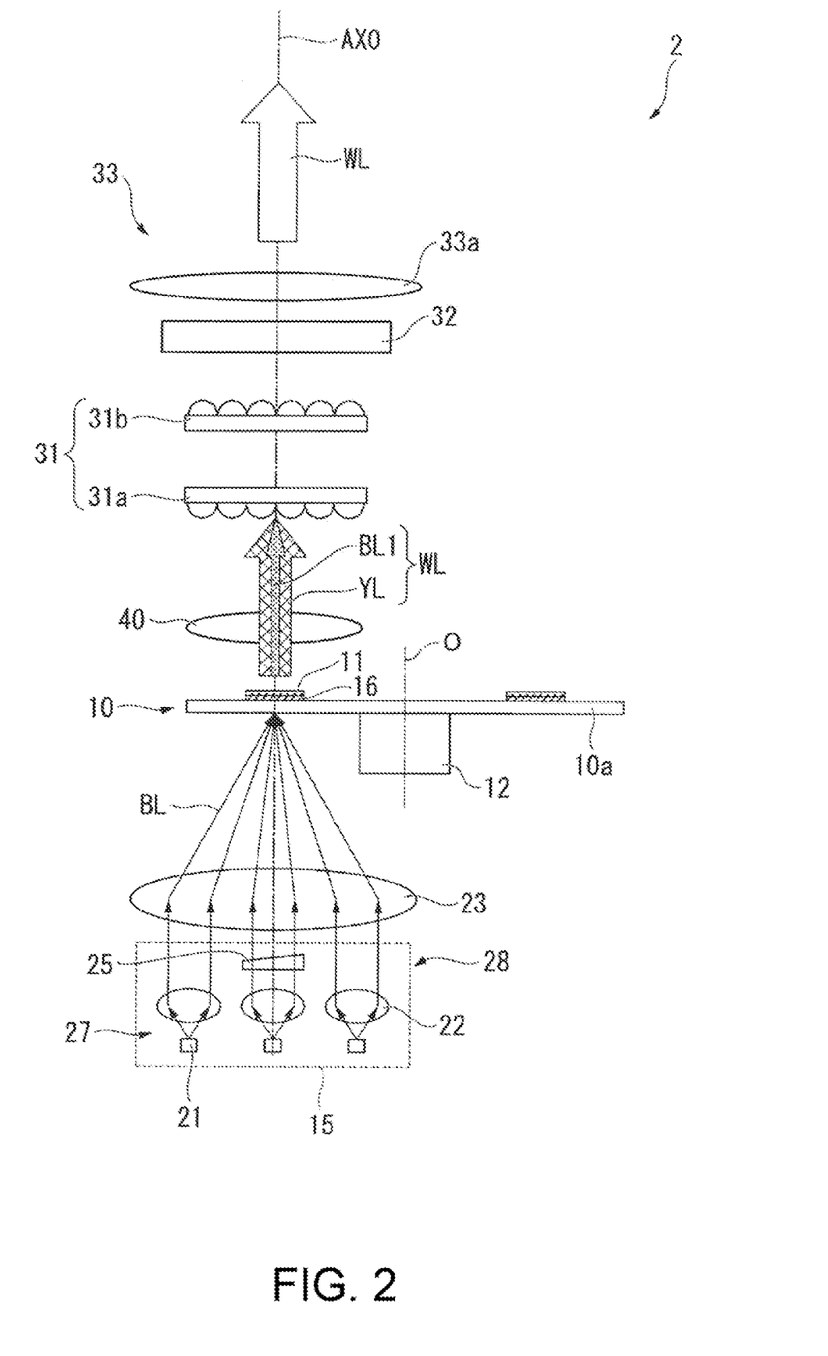
FIG. 2 is a schematic configuration diagram showing an illumination device of the first embodiment.
Figure 3:
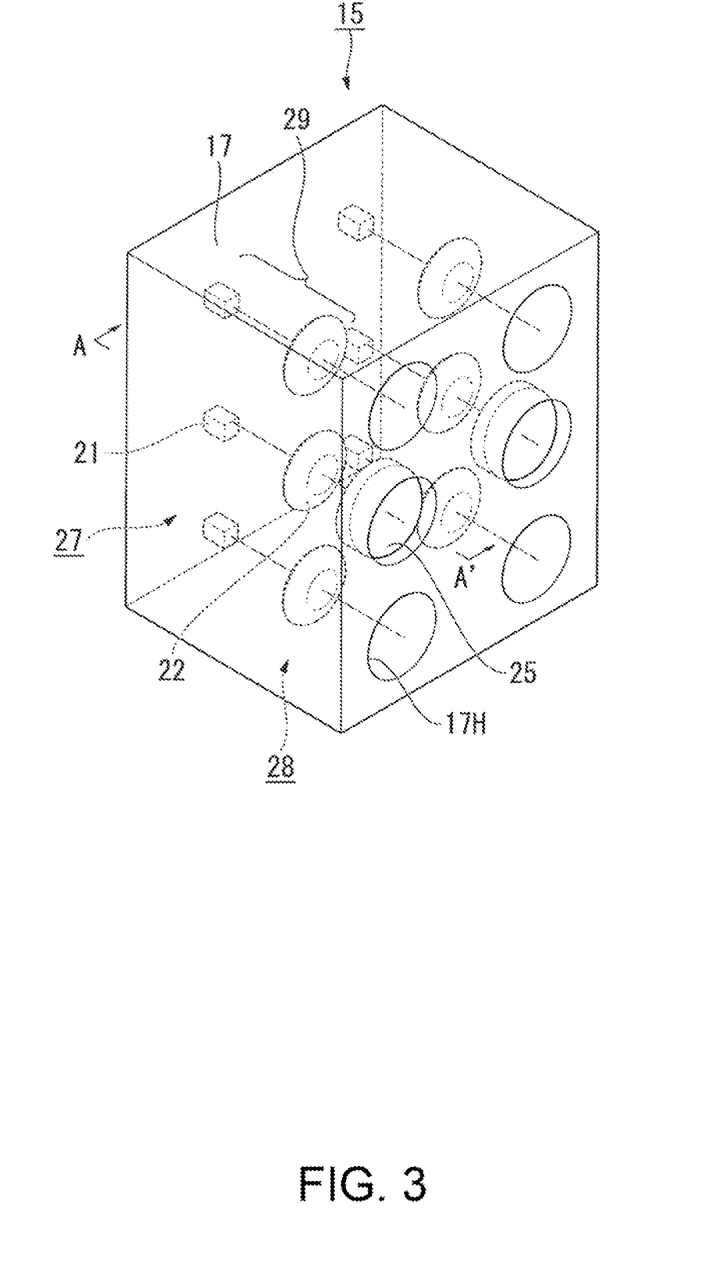
FIG. 3 is a perspective view showing a light source device of the first embodiment.
Figure 4:
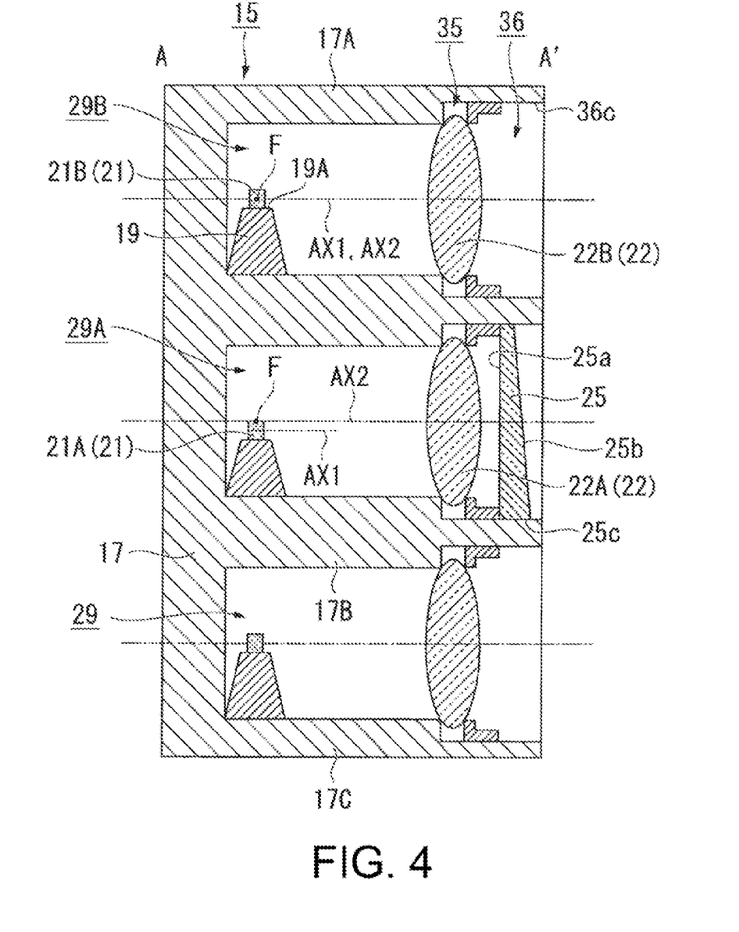
FIG. 4 is a cross-sectional view taken along the line A-A' in FIG. 3.

FIG. 1 is a schematic configuration diagram showing the projector of the embodiment. FIG. 2 is a schematic configuration diagram showing an illumination device of the embodiment. FIG. 3 is a perspective view showing a light source device of the embodiment. FIG. 4 is a cross-sectional view taken along the line A-A' in FIG. 3.

In the drawings below, components may be shown in different dimension scales for the sake of clarity of each of the components.

As shown in FIG. 1, the projector 1 of the embodiment is a projection type image display device that displays a color image on a screen SCR. The projector 1 includes three light modulators corresponding to respective color lights of red light LR, green light LG, and blue light LB. The projector 1 includes, as light sources of the illumination device 2, semiconductor lasers with which high-luminance and high-output light is obtainable. The projector 1 includes the illumination device 2, a color separation optical system 3, a light modulator for red light 4R, a light modulator for green light 4G, a light modulator for blue light 4B, a combining optical system 5, and a projection optical system 6.

The illumination device 2 emits white illumination light WL toward the color separation optical system 3. For the illumination device 2, an illumination device as an embodiment of the invention, which will be described later, is used.

The color separation optical system 3 separates the illumination light WL emitted from the illumination device 2 into the red light LR, the green light LG, and the blue light LB. The color separation optical system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a has a function of separating the illumination light WL emitted from the illumination device 2 into the red light LR and light including the green light LG and the blue light LB. The first dichroic mirror 7a transmits the red light LR therethrough while reflecting the green light LG and the blue light LB. The second dichroic mirror 7b has a function of separating the light reflected by the first dichroic mirror 7a into the green light LG and the blue light LB. The second dichroic mirror 7b reflects the green light LG while transmitting the blue light LB therethrough.

The first reflection mirror 8a is disposed in the optical path of the red light LR. The first reflection mirror 8a reflects the red light LR transmitted through the first dichroic mirror 7a toward the light modulator for red light 4R. The second reflection mirror 8b and the third reflection mirror 8c are disposed in the optical path of the blue light LB. The second reflection mirror 8b and the third reflection mirror 3c direct the blue light LB transmitted through the second dichroic mirror 7b to the light modulator for blue light 4B. The green light LG is reflected by the second dichroic mirror 7b and travels toward the light modulator for green light 4G.

The first relay lens 9a and the second relay lens 9b are disposed on the light exiting side of the second dichroic mirror 7b in the optical path of the blue light LB. The first relay lens 9a and the second relay lens 9b have a function of compensating for light loss of the blue light LB due to the fact that the optical path length of the blue light LB is longer than the optical path length of the red light LR or the green light LG.

The light modulator for red light 4R modulates the red light LR in accordance with image information and forms image light corresponding to the red light LR. The light modulator for green light 4G modulates the green light LG in accordance with image information and forms image light corresponding to the green light LG. The light modulator for blue light 4B modulates the blue light LB in accordance with image information and forms image light corresponding to the blue light LB.

For each of the light modulator for red light 4R, the light modulator for green light 4G, and the light modulator tor blue light 4B, for example, a transmissive liquid crystal panel is used. Moreover, a polarizer (not shown) is disposed on each of the incident and exiting sides of the liquid crystal panel. The polarizer transmits therethrough a linearly polarized light in a specific direction.

A field lens 10R is disposed on the incident side of the light modulator for red light 4R. A field lens 10G is disposed on the incident side of the light modulator for green light 4G. A field lens 10B is disposed on the incident side of the light modulator for blue light 4B. The field lens 10R collimates the red light LR to be incident on the light modulator for red light 4R. The field lens 10G collimates the green light LG to be incident on the light modulator for green light 4G. The field lens 10B collimates the blue light LB to be incident on the light modulator for blue light 4B.

The combining optical system 5 combines image lights respectively corresponding to the red light LR, the green light LG, and the blue light LB, and emits the combined image light toward the projection optical system 6. For the combining optical system 5, for example, a cross dichroic prism is used.

The projection optical system 6 is composed of a projection lens group including a plurality of projection lenses. The projection optical system 6 enlarges and projects the image light combined by the combining optical system 5 onto the screen SCR. Due to this, an enlarged color image is displayed on the screen SCR.

Hereinafter, the illumination device 2 will be described.

As shown in FIG. 2, the illumination device 2 includes a light source device 15, a condensing lens 23, a phosphor wheel 10, a pickup lens 40, an integrator optical system 31, a polarization conversion element 32, and a superimposing optical system 33. The light source device 15 includes a solid-state light source array 27, a collimator optical system 28, and a deflection prism 25. The light source device 15 will be described in detail later.

In the above components, the solid-state light source array 27, the collimator optical system 28, the condensing lens 23, the pickup lens 40, the integrator optical system 31, the polarization conversion element 32, and the superimposing optical system 33 are successively aligned on an optical axis AX0 shown in FIG. 2 with the respective optical centers coincident with the optical axis AX0.

The solid-state light source array 27 includes a plurality of semiconductor lasers 21. The plurality of semiconductor lasers 21 are aligned in an array in a plane orthogonal to the optical axis AX0. The number of semiconductor lasers 21 is not particularly limited.

The semiconductor laser 21 emits, for example, blue excitation light. The excitation light BL emitted from the solid-state light source array 27 is incident on the collimator optical system 28. The collimator optical system 28 converts a plurality of excitation lights BL emitted from the solid-state light source array 27 into parallel light beams. The collimator optical system 28 is composed of, for example, a plurality of collimator lenses 22 aligned in an array. The plurality of collimator lenses 22 are disposed respectively corresponding to the plurality of semiconductor lasers 21.

The excitation light BL emitted from one collimator lens 22 (the collimator lens 22 at the center in FIG. 2) of the collimator optical system 28 transmits through the deflection prism 25 and is incident on the condensing lens 23. The excitation lights BL emitted from the other collimator lenses 22 (the collimator lenses 22 at the right and left ends in FIG. 2) are incident on the condensing lens 23 without transmitting through the deflection prism 25. The condensing lens 23 concentrates the plurality of excitation lights BL so as to be incident on the phosphor wheel 10 at a predetermined position.

The phosphor wheel 10 of the embodiment is a transmissive rotating fluorescent screen. The phosphor wheel 10 includes a disk-shaped substrate 10a rotationally driven by a motor 12, and a phosphor layer 11 formed annularly on one of surfaces of the substrate 10a. Although not shown in the drawing, a dichroic mirror 16 formed of, for example, a dielectric multilayer film is provided between the substrate 10a and the phosphor layer 11. The dichroic mirror 16 has characteristics of transmitting the excitation light BL therethrough and reflecting fluorescence YL generated from the phosphor layer 11.

The substrate 10a rotates about an axis of rotation O at a predetermined number of rotations during the use of the projector 1. Due to this, the excitation light BL is prevented from being continuously incident on a specific area of the phosphor layer 11, so that a longer life of the phosphor layer 11 is achieved. The shape of the substrate 10a is not limited to the disk shape. The substrate 10a is configured with a material transmitting the excitation light BL therethrough. As the material of the substrate 10a, for example, silica glass, quarts crystal, sapphire, optical glass, transparent resin, or the like can be used.

The phosphor layer 11, which contains phosphor particles that fluoresce, absorbs the excitation light BL (blue light), converts the excitation light EL (blue light) into yellow fluorescence YL, and emits the yellow fluorescence YL. The phosphor particle is a particulate fluorescent substance that absorbs the excitation light BL and fluoresces. For example, the phosphor particles, which contain a substance that is excited by blue light at a wavelength of about 450 nm and fluoresces, convert the excitation light BL into the yellow fluorescence YL and emit the yellow fluorescence YL. As the phosphor particles, for example, YAG (yttrium aluminum garnet) based phosphor can be used. The forming material of the phosphor particles may be of one kind, or a mixture of particles formed using two or more kinds of materials may be used as the phosphor particles.

A portion of the excitation light BL incident on the phosphor layer 11 is absorbed by the phosphor particles and thus converted into the fluorescence YL. The fluorescence YL is directly emitted from the phosphor layer 11, or the fluorescence YL is reflected by the dichroic mirror 16 and then emitted from the phosphor layer 11 to the outside. On the other hand, a component of the excitation light BL, which is not absorbed by the phosphor particles, is emitted from the phosphor layer 11 to the outside.

The fluorescence YL emitted from the phosphor layer 11 of the phosphor wheel 10 and blue light BL1 as one component of the excitation light BL constitute the white illumination light WL. The illumination light WL is incident on the integrator optical system 31 via the pickup lens 40. The integrator optical system 31 divides the illumination light WL into a plurality of small light beams. The integrator optical system 31 is composed of, for example, a first ions optical system 31 is composed of, for example, a first lens array 31a and a second lens array 31b. The first lens array 31a and the second lens array 31b each have a configuration including a plurality of lenses arranged in an array.

The illumination light WL emitted from the integrator optical system 31 is incident on the polarization conversion element 32. The polarization conversion element 32 has a function of converting the illumination light WL as unpolarized light into linearly polarized light. The polarization conversion element 32 is composed of, for example, a polarization separation film, a retardation film, and a mirror.

The illumination light WL converted into the linearly polarized light by the polarization conversion element 32 is incident on a superimposing lens 33a. The superimposing lens 33a superimposes on each other the plurality of light beams emitted from the polarization conversion element 32 on the liquid crystal panel as an illumination object. Due to this, the liquid crystal panel can be uniformly illuminated. The superimposing optical system 33 is composed of the integrator optical system 31 including the first lens array 31a and the second lens array 31b, and the superimposing lens 33a.

Although the phosphor wheel 10 of the embodiment includes the transmissive rotating fluorescent screen, the phosphor wheel may include a reflective rotating fluorescent screen instead of this configuration. Moreover, the fluorescent screen may not be necessarily a rotating fluorescent screen but may be a fixed fluorescent screen.

Hereinafter, the light source device 15 will be described.

As shown in FIG. 3, the light source device 15 includes a housing 17, the plurality of semiconductor lasers 21, the plurality of collimator lenses 22, and the deflection prism 25. Although not shown in FIG. 2, the plurality of semiconductor lasers 21, the plurality of collimator lenses 22, and the deflection prism 25 are accommodated in the interior of the housing 17. The housing 17 is a box of a size capable of accommodating the plurality of semiconductor lasers 21, the plurality of collimator lenses 22, and the deflection prism 25. The housing 17 is provided with a plurality of holes 17H through which lights emitted from the plurality of semiconductor lasers 21 pass.

In the embodiment, six semiconductor lasers 21 are used as the plurality of semiconductor lasers 21. However, the number of semiconductor lasers 21 is not limited to six and not particularly limited. The six semiconductor lasers 21 are disposed in an array of three rows and two columns and constitute the solid-state light source array 27. The number of the collimator lenses 22 to be used is the same as the semiconductor lasers 21. The collimator lens 22 is disposed on the optical path of light emitted from each of the semiconductor lasers 21. Hence, the six collimator lenses 22 are disposed in an array of three rows and two columns in the same manner as the semiconductor lasers 21 and constitute the collimator optical system 28. Hereinafter, a set of semiconductor laser 21 and collimator lens 22 that correspond to each other may also be referred to as a light source unit 29.

As shown in FIG. 4, partition wall portions 17B for partitioning the interior space of the housing 17 into six spaces are provided in the housing 17. Bases 19 are provided on an upper surface of the partition wall portion 17B and an upper surface of a bottom portion 17C. The semiconductor laser 21 is mounted on a mounting surface 19A as an upper surface of the base 19. Moreover, lens holding portions 35 each of which holds the collimator lens 22 in the form of interposing the circumferential edge of the collimator lens 22 are provided in the housing 17. An upper portion 17A, the bottom portion 17C, and the partition wall portion 17B of the housing 17 have portions projecting to the light exiting side of the lens holding portion 35.

The light source device 15 is designed such that, like the light source unit 29 on the upper stage and the lower stage shown in FIG. 4, the semiconductor laser 21 is disposed at a focal position F of the collimator lens 22 to which the semiconductor laser 21 itself corresponds. In this case, a principal ray AX1 of light emitted from the semiconductor laser 21 immediately before being incident on the collimator lens 22 coincides with an optical axis AX2 of the collimator lens 22. Hereinafter, the principal ray AX1 of light emitted from the semiconductor laser 21 immediately before being incident on the collimator lens 22 is simply referred to as the principal ray AX1 or the principal ray AX1 of light emitted from the semiconductor laser 21. Design parameters, such as the dimensions of the semiconductor laser 21, the height of the base 19, the inclination of the mounting surface 19A, the dimensions of the collimator lens 22, and the position of the collimator lens 22 held by the lens holding portion 35, are set such that the principal ray AX1 of light emitted from each of the semiconductor lasers 21 coincides with the optical axis AX2 of each of the collimator lenses 22.

However, for example, due to factors such as dimension errors of the semiconductor laser 21, the base 19, the collimator lens 22, the lens holding portion 35, and the like, the principal ray AX1 may not coincide with the optical axis AX2 of the collimator lens 22 like the light source unit 29 on the middle state in FIG. 4.

In the following description, the semiconductor laser 21 and the collimator lens 22 of the light source unit 29 in which the principal ray AX1 does not coincide with the optical axis AX2 are referred to as a first semiconductor laser 21A and a first collimator lens 22A, respectively. The semiconductor laser 21 and the collimator lens 22 of the light source unit 29 in which the principal ray AX1 coincides with the optical axis AX2 are referred to as a second semiconductor laser 21B and a second collimator lens 22B, respectively. In FIG. 4, the semiconductor laser 21 and the collimator lens 22 of the light source unit 29 on the middle stage are referred to as the first semiconductor laser 21A and the first collimator lens 22A, respectively, while the semiconductor laser 21 and the collimator lens 22 of the light source unit 29 on the upper stage are referred to as the second semiconductor laser 21B and the second collimator lens 22B, respectively. Moreover, light emitted from the first semiconductor laser 21A is referred to as first light L1, while light emitted from the second semiconductor laser 21B is referred to as second light L2. A principal ray of the first light L1 immediately after transmitted through the collimator lens 22A is referred to as a principal ray Lc1, while a principal ray of the second light L2 immediately after transmitted through the collimator lens 22B is referred to as a principal ray Lc2.

Figure 6A:
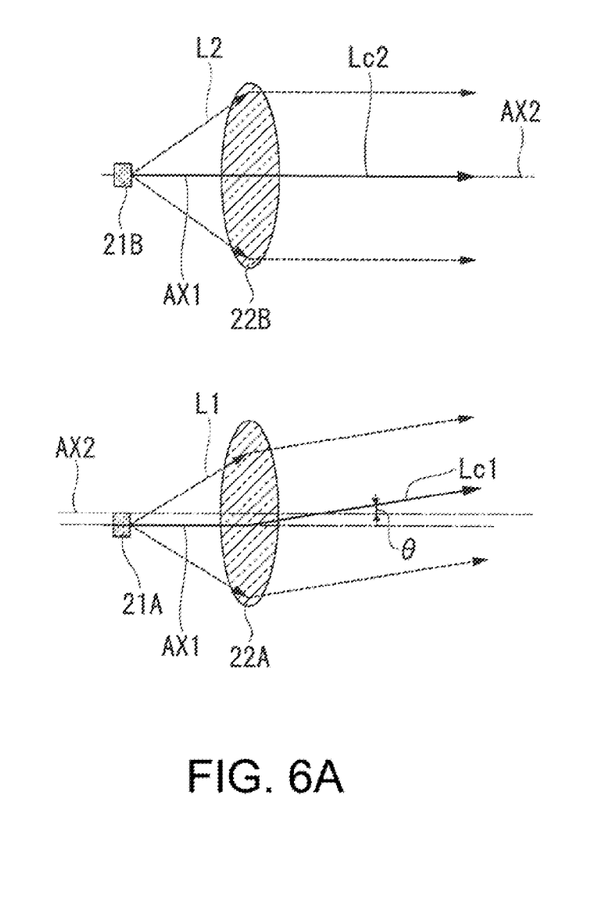
FIG. 6A is a diagram showing the state of emitted light in a light source device not including a deflection prism.

When the principal ray AX1 does not coincide with the optical axis AX2 of the collimator lens 22, the principal ray Lc1 and the principal ray Lc2 are not parallel to each other and form a predetermined angle θ as shown in the lower section of FIG. 6A.

In FIG. 6A, the principal ray Lc2 and the optical axis AX2 of the first collimator lens 22A are parallel to each other. Hence, in FIG. 6A, an angle formed by the principal ray Lc1 and the principal ray Lc2 is shown as the angle θ formed by the optical axis AX2 of the first collimator lens 22A and the principal ray Lc1 for the sake of convenience of illustration.

For the light source unit 29 in which the principal ray AX1 does not coincide with the optical axis AX2 of the collimator lens 22 as described above, that is, for a first light source unit 29A including the first semiconductor laser 21A and the first collimator lens 22A, the deflection prism 25 is provided on the light exiting side of the first collimator lens 22A as shown in FIG. 4. The deflection prism 25 has a shape obtained by cutting a portion of a light-transmissive circular plate at a plane inclined to the axis of rotation of the circular plate. The shape of the deflection prism 25 as viewed from a direction of the optical axis AX2 of the first collimator lens 22A is a circle.

The deflection prism 25 has a flat face 25a and an inclined surface 25b. The flat face 25a is vertical to an annular side surface 25c and serves as a light incident surface. The inclined surface 25b is inclined to the side surface 25c and serves as a light exiting surface. The portions projecting from the lens holding portions 35 in the upper portion 17A, the bottom portion 17C, and the partition wall portion 17B of the housing 17 are provided with cylindrical openings as shown in FIG. 3, and each cylindrical portion functions as a prism holding portion 36. The deflection prism 25 is held in the form of being fitted into the interior space of the prism holding portion 36 having a cylindrical inner wall surface 36c.

The prism holding portion 36 of the embodiment corresponds to a holding portion in the appended claims.

The deflection prism 25 is held by the prism holding portion 36 so as to be rotatable about a predetermined axis (the optical axis AX2 of the first collimator lens 22A). Specifically, the inner wall surface 36c of the prism holding portion 36 is a smooth surface, and the prism holding portion 36 does not include a portion that inhibits the rotation of the deflection prism 25. The portion that inhibits the rotation of the deflection prism 25 is a portion such as a projection or a recess that is fitted to the perimeter of the deflection prism when, for example, the deflection prism has a shape other than a circle. Hence, when a manufacturer of the light source device wants to rotate the deflection prism 25 about the optical axis of the first collimator lens 22A, the manufacturer can easily rotate the deflection prism 25. That is, it is sufficient that the deflection prism 25 is configured to be able to rotate in the manufacturing process of the light source device. The deflection prism 25 may be configured such that the deflection prism 25 is fixed to the prism holding portion 36 after the completion of the light source device and thus cannot rotate.

Figure 5:
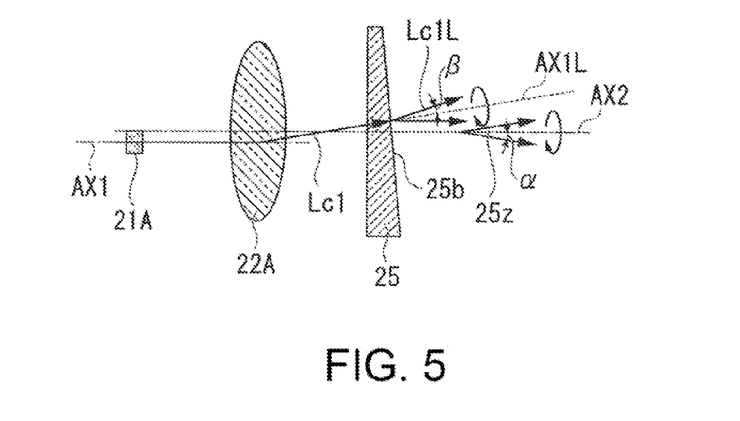
FIG. 5 is a diagram for explaining an action of a set of light source and deflection prism.

The function of the deflection prism 25 will be described with reference to FIG. 5. In FIG. 5, however, only a principal ray of light emitted from the first semiconductor laser 21A is shown for simplifying the drawing. Moreover, the optical axis of the principal ray Lc1 before being incident on the deflection prism 25 is defined as AX1L.

As shown in FIG. 5, when the deflection prism 25 rotates about the optical axis AX2 of the first collimator lens 22A, a normal 25z of the inclined surface 25b rotates about an axis parallel to the optical axis AX2 while keeping a predetermined angle α relative to the optical axis AX2. With the rotation of the deflection prism 25, a principal ray Lc1L of light transmitted through the deflection prism 25 rotates about an axis parallel to the optical axis Ax1L while keeping a predetermined angle β relative to the optical axis Ax1L. Hence, by rotating the deflection prism 25 about the optical axis AX2, it is possible to cause the principal ray Lc1 to travel in a desired direction.

On the other hand, as shown in FIG. 4, the deflection prism 25 is not provided for the light source unit 29 in which the principal ray AX1 coincides with the optical axis AX2 of the collimator lens 22, that is, for a second light source unit 29B including the second semiconductor laser 21B and the second collimator lens 22B.

Hereinafter, a method for manufacturing the light source device 15 having the above configuration will be described.

First, the light source device 15 not including the deflection prism 25 is prepared.

Subsequently, all of the light source units 29 are inspected as to whether a principal ray of light emitted from the semiconductor laser 21 coincides with the optical axis of the collimator lens 22 corresponding to the relevant semiconductor laser 21.

Figure 7:
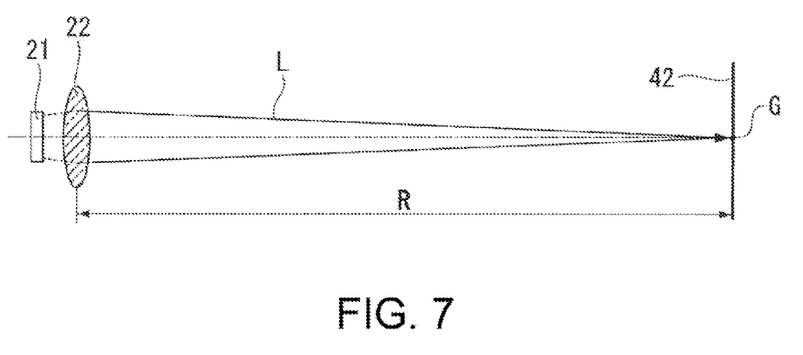
FIG. 7 is a diagram for explaining an inspection method of the mounting position of a laser light source.

A specific inspection method will be described with reference to FIGS. 7 and 8. In FIG. 7, the housing 17 is not shown.

As shown in FIG. 7, a manufacturer of the light source device disposes a screen (projected surface) 42 at a position away from the collimator lens 22 by a constant distance R, for example, 1 m, and projects light L emitted from the semiconductor laser 21 onto the screen 42. At this time, a projected image G caused by the light L emitted from the semiconductor laser 21 is formed on the screen 42.

Subsequently, the manufacturer visually inspects whether the projected image G is located inside an allowable range or outside the allowable range. This inspection is performed on ail of the light source units 29.

Figure 8:
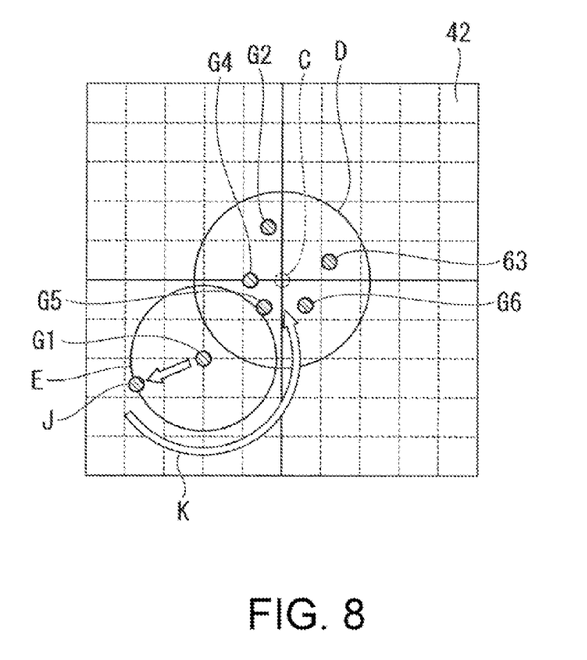
FIG. 8 is a diagram showing a projected image of light from a plurality of laser light sources on a screen.

FIG. 8 shows a projected image formed on the screen 42 by one light source unit 29. However, circles indicated by reference signs G1 to G6 are projected images obtained when deviations between the principal ray AX1 and the optical axis AX2 of the collimator lens 22 are different. Six projected images are shown in FIG. 8, but actually, only one projected image is formed.

A position at which a projected image is formed when the principal ray AX1 completely coincides with the optical axis AX2 of the collimator lens 22 is defined as a reference point C. When the principal ray AX1 is deviated from the optical axis AX2 of the collimator lens 22, the projected image is formed at a position deviated from the reference point C as shown in FIG. 8. A circle indicated by reference sign D shows the allowable range of the forming position of the projected image. Light incident on an inside of the allowable range D is concentrated on a predetermined area by the condensing lens 23, foot light incident on an outside of the allowable range D cannot be concentrated on the predetermined area by the condensing lens 23. As described above, the range allowing the light incident therein to foe concentrated on the predetermined area by the condensing lens 23 is set as the allowable range D with respect to one light source unit 29.

As described above, the principal ray AX1 is deviated from the optical axis AX2 of the first collimator lens 22A in the first light source unit 29A. Here, it is assumed that the projected image G1 of the first light L1 emitted from the first light source unit 29A is located outside the allowable range D. In this case, the first light L1 cannot be concentrated on the predetermined area by the condensing lens 23.

Therefore, the manufacturer disposes the deflection prism 25 on the light exiting side of the first collimator lens 22A. Since the traveling direction of the principal ray Lc1 is bent by the deflection prism 25, the projected image G1 caused by the first light source unit 29A is moved to a position J.

Next, the deflection prism 25 is rotated about the optical axis AX2 of the first collimator lens 22A. Due to this, as indicated by the arrow K in FIG. 8, the projected image G1 moves while depicting the locus of a circle indicated by reference sign E with the rotation of the deflection prism 25.

In this manner, the projected image G1 can be moved to an inside of the allowable range D on the screen 42. The manufacturer may stop the rotational operation of the deflection prism 25 at the instant when the projected image G1 is moved to any position inside the allowable range D, for example, to a position closest to the reference point C. After rotating the deflection prism 25 to a proper position, the manufacture may fix the deflection prism 25 to the prism holding portion 36 using, for example, an adhesive, a jig, or the like.

FIG. 7 depicts the semiconductor laser 21, the collimator lens 22, and the screen 42 aligned in the horizontal direction of the paper surface. In contrast, it is preferable, when actually rotating the deflection prism 25, that the semiconductor laser 21, the collimator lens 22, and the deflection prism 25 are aligned in the vertical direction, and that the screen 42 is installed in a space above the deflection prism 25. The reason for this is that the following advantages can be obtained: for example, workability such as the rotational operation of the deflection prism 25 is improved; and each optical component is not deviated in a direction vertical to its own optical axis due to its own weight.

Through the process described above, the light source device 15 of the embodiment is completed.

Figure 6B:
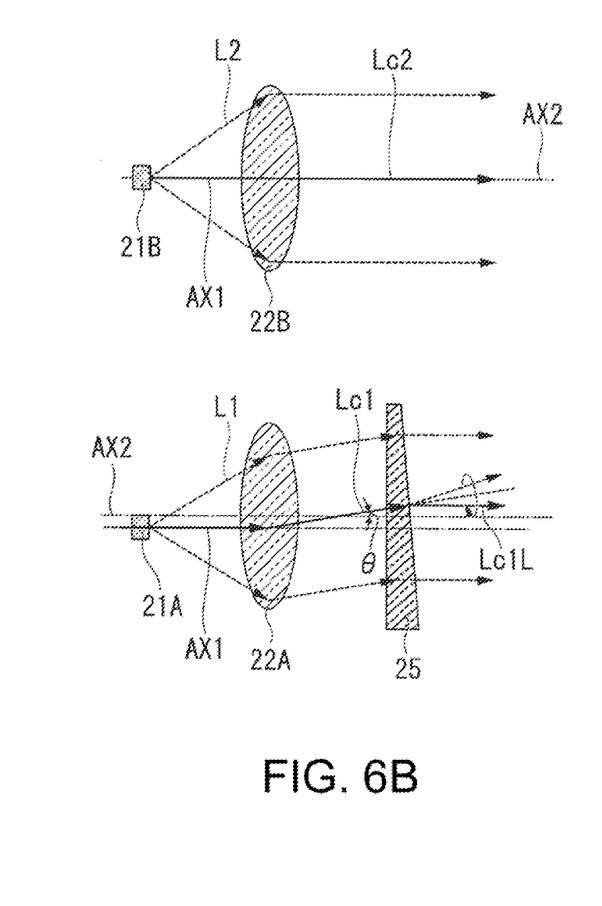
FIG. 6B is a diagram showing the state of emitted light in a light source device including a deflection prism.

In a state before the deflection prism 25 is provided, the principal ray Lc1 and the principal ray Lc2 form the predetermined angle $\theta$ as shown in FIG. 6A. In contrast, in the light source device provided with she deflection prism 25 as shown in FIG. 6B, the principal ray Lc1 in a position anterior to the deflection prism 25 forms the angle $\theta$ with the principal ray Lc2, but the principal ray Lc1 (Lc1L) in a position posterior to the deflection prism 25 is parallel to the principal ray Lc2. In this manner, the angle formed by the principal ray Lc1 and the principal ray Lc2 can be made smaller in the position posterior to the deflection prism 25 than in the position anterior thereto.

As described above, in the light source device 15 of the embodiment, the projected image G1 of the first light L1 from the first semiconductor laser 21A whose mounting position is deviated can be moved into the allowable range on the projected surface by using the deflection prism 25. Due to this, light from the first semiconductor laser 21A, in addition to lights from other semiconductor lasers including the second semiconductor laser 21B, can also be concentrated on the predetermined area by the condensing lens 23. Hence, even when there are variations in the mounting accuracy of the plurality of semiconductor lasers 21, the optical path of light from the semiconductor laser that is mounted at a position deviated from a predetermined position can be corrected by the deflection prism 25, thereby making it possible to increase light-use efficiency.

Since the projector 1 of the embodiment includes the light source device 15, it is possible to realize a projector having excellent light-use efficiency.

In the method for manufacturing the light source device 15 of the embodiment, when the manufacturer finds out that the projected image G1 of the first light L1 emitted from the first semiconductor laser 21A is located outside the allowable range D, the manufacturer disposes the deflection prism 25 on the light exiting side of the first collimator lens 22A, and rotates the deflection prism 25 until the projected image G1 is moved to the inside of the allowable range D. As described above, since it is sufficient that an adjustment is performed with the deflection prism 25 only on the semiconductor laser 21 whose mounting position is deviated, the light source device 15 in which a reduction in light-use efficiency is suppressed can be manufactured with good productivity. It is difficult to alter the mounting position of the semiconductor laser 21, and considerable cost is to be spent. According to the manufacturing method of the embodiment, however, a light source device in which the mounting position of semiconductor lasers is varied can be used merely by adding the deflection prism 25. Therefore, it is possible to achieve a reduction in the manufacturing cost of the projector 1, shortening of a manufacturing period, or the like.

Second Embodiment

Hereinafter, a second embodiment of the invention will be described with reference to FIG. 9.

A basic configuration of a light source device of the embodiment is similar to that of the first embodiment, but the configuration of a housing of the embodiment is different from that of the first embodiment.

Figure 9:
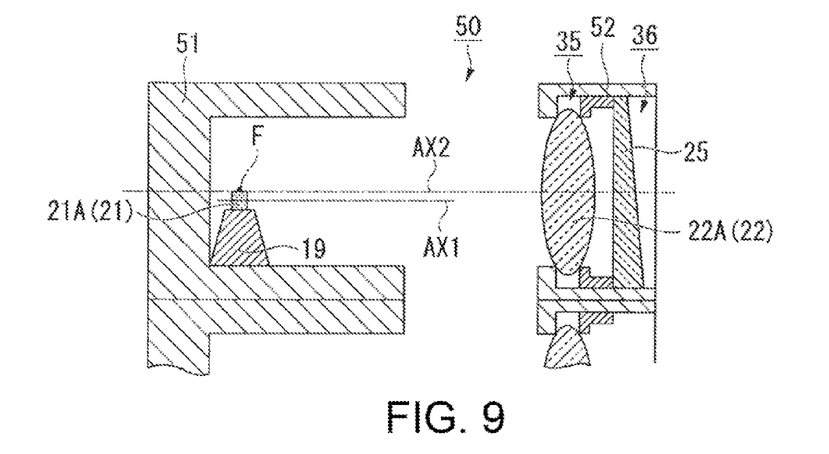
FIG. 9 is a cross-sectional view showing a light source device of a second embodiment.

FIG. 9 is a cross-sectional view showing the light source device of the embodiment.

In FIG. 9, common components with those in FIG. 4 of the first embodiment are denoted by the same reference signs, and a description thereof is omitted.

In the light source device of the first embodiment, all of the plurality of semiconductor lasers, the plurality of collimator lenses, and the deflection prism are accommodated in one housing. In contrast, in the light source device 50 of the embodiment as shown in FIG. 9, the plurality of semiconductor lasers 21 are accommodated in a first housing 51, while the plurality of collimator lenses 22 and the deflection prism 25 are accommodated in a second housing 52. The second housing 52 is provided with the lens holding portion 35 on the side on which light from the semiconductor laser 21 is incident, and provided with the prism holding portion 36 on the light exiting side. The configurations of the lens holding portion 35 and the prism holding portion 36 are similar to those of the first embodiment. In this manner, the plurality of semiconductor lasers 21, and the plurality of collimator lenses 22 and the deflection prism 25 may be held in a plurality of housings separate from each other. It is preferable that the first housing 51 and the second housing 52 are aligned with each other using any member (not shown).

Also in the light source device 50 of the embodiment, advantageous effects similar to those of the first embodiment, such as being able to realize a light source device having high light-use efficiency even when there are variations in the mounting accuracy of a plurality of semiconductor lasers, are obtained.

Third Embodiment

Hereinafter, a third embodiment of the invention will be described with reference to FIG. 10.

A basic configuration of a light source device of the embodiment is similar to that of the first embodiment, but the configuration of a deflection prism of the embodiment is different from that of the first embodiment.

Figure 10:
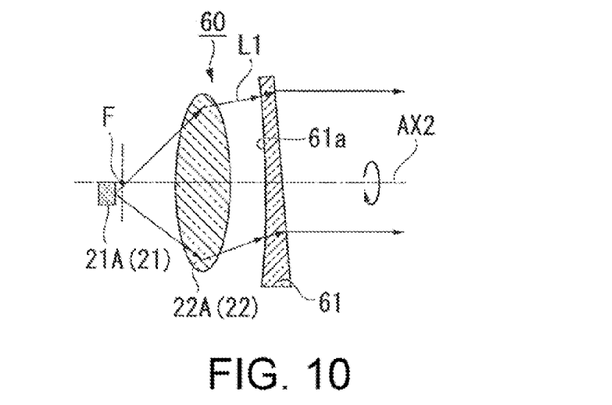
FIG. 10 is a schematic configuration diagram showing a light source device of a third embodiment.

FIG. 10 is a cross-sectional view showing the light source device of the embodiment.

In FIG. 10, common components with those in FIG. 4 of the first embodiment are denoted by the same reference signs, and a description thereof is omitted.

In the first embodiment, the light incident surface of the deflection prism is a flat face vertical to the optical axis of the first collimator lens. In contrast, in the light source device 60 of the embodiment as shown in FIG. 10, a light incident surface 61a of the deflection prism 61 is a concave surface rotationally symmetric about the optical axis AX2 of the first collimator lens 22A. That is, the light incident surface 61a of the deflection prism 61 is a curved concave surface that is dented as viewed from the first semiconductor laser 21A side. The first semiconductor laser 21A is deviated in a direction vertical to the optical axis AX2 of the first collimator lens 22A, and is deviated, in a direction parallel to the optical axis AX2, to the side farther from the first collimator lens 22A than the focal position F of the first collimator lens 22A.

The manufacturer of the light source device checks the projected image of the first light in accordance with the inspection method described in the first embodiment. It is possible, by observing the state of blurring of the projected image on the screen, to find out a position deviation of the first semiconductor laser 21A in the direction parallel to the optical axis AX2 of the first collimator lens 22A. Further, the manufacturer of the light source device can determine from the state of the projected image that the position of the first semiconductor laser 21A is deviated to the side farther from the first collimator lens 22A relative to the focal position F of the first collimator lens 22A.

When the first semiconductor laser 21A is deviated to the side farther than the focal position F of the first collimator lens 22A, the light L1 emitted from the first collimator lens 22A is not parallel light but convergent light. In the case of the embodiment, since the light incident surface 61a of the deflection prism 61 is a concave surface, the convergent light incident on the deflection prism 61 is converted into parallel light and emitted from the deflection prism 61.

Also in the embodiment, advantageous effects similar to those of the first embodiment, such as being able to realize a light source device having high light-use efficiency even when there are variations in the mounting accuracy of a plurality of semiconductor lasers, are obtained.

Fourth Embodiment

Hereinafter, a fourth embodiment of the invention will be described with reference to FIG. 11.

A basic configuration of a light source device of the embodiment is similar to that of the first embodiment, but the configuration of a deflection prism of the embodiment is different from that of the first embodiment.

Figure 11:
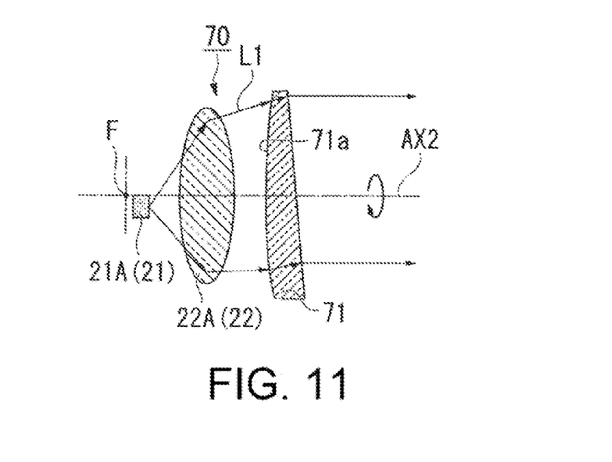
FIG. 11 is a schematic configuration diagram showing a light source device of a fourth embodiment.

FIG. 11 is a cross-sectional view showing the light source device of the embodiment.

In FIG. 11, common components with those in FIG. 4 of the first embodiment are denoted by the same reference signs, and a description thereof is omitted.

In the light source device 70 of the embodiment as shown in FIG. 11, a light incident surface 71a of the deflection prism 71 is a convex surface rotationally symmetric about the optical axis AX2 of the first collimator lens 22A. That is, the light incident surface 71a of the deflection prism 71 is a curved convex surface that projects to the first collimator lens 22A side. The first semiconductor laser 21A is deviated in the direction vertical to the optical axis AX2 of the first collimator lens 22A, and is deviated, in the direction parallel to the optical axis AX2, too the side closer to the first collimator lens 22A relative to the focal position F of the first collimator lens 22A.

The manufacturer of the light source device checks the projected image of the first light in accordance with the inspection method described in the first embodiment. It is possible to determine from the state of the projected image on the screen that the position of the first semiconductor laser 21A is deviated to the side closer to the first collimator lens 22A relative to the focal position F of the first collimator lens 22A.

When the first semiconductor laser 21A is deviated to the side closer to the first collimator lens 22A than the focal position F of the first collimator lens 22A, the light L1 emitted from the first collimator lens 22A is not parallel light but divergent light. In the case of the embodiment, since the light incident surface 71a of the deflection prism 71 is a convex surface, the divergent light incident on the deflection prism 71 is converted into parallel light and emitted from the deflection prism 71.

Also in the embodiment, advantageous effects similar to those of the first embodiment, such as being able to realize a light source device having high light-use efficiency even when there are variations in the mounting accuracy of a plurality of semiconductor lasers, are obtained.

The technical scope of the invention is not limited to the embodiments, and various modifications can be added thereto within the range not departing from the gist of the invention.

For example, in the light source device of the embodiments, an example has been shown in which the deflection prism is disposed only for the light source unit in which the projected image of light emitted from the semiconductor laser is deviated outside the allowable range. However, if some light loss is acceptable, the deflection prism may be disposed also for the light source unit in which the projected image is located in the allowable range, in addition to the light source unit in which the projected image of light emitted from the semiconductor laser is deviated outside the allowable range. In addition, the shape, number, arrangement, material, and the like of each component of the light source device and the projector are not limited to those of the embodiments, but can be appropriately changed.

Although an example of mounting the illumination device according to the invention on the projector has been shown in the embodiment, the invention is not limited to this example. The illumination device according to the invention can be applied also to a luminaire, a headlight of an automobile, or the like.

The entire disclosure of Japanese Patent Application No. 2014-131270, filed on Jun. 26, 2014 is expressly incorporated by reference herein.

What is claimed is:

1. A light source device comprising:
   a first solid-state light source;
   a second solid-state light source;
   a first collimator lens corresponding to the first solid-state light source;
   a second collimator lens corresponding to the second solid-state light source;
   a deflection prism provided on the light exiting side of the first collimator lens so that an angle formed by a principal ray of first light emitted from the first solid-state light source and a principal ray of second light emitted from the second solid-state light source is smaller on the light exiting side of the deflection prism than on the light incident side thereof; and
   a holding portion that holds the deflection prism, wherein the deflection prism is held by the holding portion so as to be rotatable about a predetermined axis of rotation.

2. The light source device according to claim 1, wherein the shape of the deflection prism as viewed from a direction of the axis of rotation is a circle.

3. A projector comprising:
   a light source device that emits light;
   a light modulator that modulates the light in accordance with image information to thereby form image light; and
   a projection optical system that projects the image light, wherein the light source device is the light source device according to claim 2.

4. The light source device according to claim 1, wherein a light incident surface of the deflection prism is flat.

5. A projector comprising:
   a light source device that emits light;
   a light modulator that modulates the light in accordance with image information to thereby form image light; and
   a projection optical system that projects the image light, wherein the light source device is the light source device according to claim 4.

6. The light source device according to claim 1, wherein a light incident surface of the deflection prism is rotationally symmetric and convex.

7. A projector comprising:
   a light source device that emits light;
   a light modulator that modulates the light in accordance with image information to thereby form image light; and
   a projection optical system that projects the image light, wherein the light source device is the light source device according to claim 6.

8. The light source device according to claim 1, wherein a light incident surface of the deflection prism is rotationally symmetric and concave.

9. A projector comprising:
   a light source device that emits light;
   a light modulator that modulates the light in accordance with image information to thereby form image light; and
   a projection optical system that projects the image light, wherein the light source device is the light source device according to claim 8.

10. A projector comprising:
    a light source device that emits light;
    a light modulator that modulates the light in accordance with image information to thereby form image light; and
    a projection optical system that projects the image light, wherein the light source device is the light source device according to claim 1.

11. A method for manufacturing a light source device including a first solid-state light source, a second solid-state light source, a first collimator lens corresponding to the first solid-state light source, a second collimator lens corresponding to the second solid-state light source, a deflection prism, and a holding portion that holds the deflection prism, the method comprising:
    inspecting whether or not a projected image of light emitted from the first solid-state light source is located outside an allowable range on a projected surface away from the first collimator lens;
    in a case where the light emitted from the first solid-state light source is located outside the allowable range, disposing the deflection prism on the light exiting side of the first collimator lens, and then rotating the deflection prism about an optical axis of the first collimator lens, whereby the projected image located outside the allowable range moves inside of the allowable range and an angle formed by a first principal ray of light emitted from the first solid-state light source and a second principal ray of light emitted from the second solid-state light source becomes smaller on the light exiting side of the deflection prism than on the light incident side thereof.

12. The method for manufacturing the light source device according to claim 11, wherein after the projected image located outside the allowable range is moved to the inside the allowable range by rotating the deflection prism about a predetermined axis in a state of being held by the holding portion, the deflection prism is fixed to the holding portion.

* * * * *